(12) United States Patent
Ladewig et al.

(10) Patent No.: US 10,035,223 B2
(45) Date of Patent: Jul. 31, 2018

(54) REPAIR METHOD FOR THE ADDITIVE REPAIR OF A COMPONENT

(71) Applicant: MTU Aero Engines AG, Munich (DE)

(72) Inventors: Alexander Ladewig, Bad Wiessee (DE); Steffen Schlothauer, Erdweg (DE); Thomas Hess, Munich (DE); Christian Liebl, Bockhorn (DE)

(73) Assignee: MTU AERO ENGINES AG, Munich (DE)

( * ) Notice: Subject to any disclaimer, the term of this patent is extended or adjusted under 35 U.S.C. 154(b) by 342 days.

(21) Appl. No.: 14/919,416

(22) Filed: Oct. 21, 2015

(65) Prior Publication Data

US 2016/0121438 A1    May 5, 2016

(30) Foreign Application Priority Data

Oct. 30, 2014    (DE) .......................... 10 2014 222 159

(51) Int. Cl.
*B23P 6/00* (2006.01)
*B22F 3/105* (2006.01)
(Continued)

(52) U.S. Cl.
CPC .............. *B23P 6/00* (2013.01); *B22F 3/1055* (2013.01); *B23P 6/002* (2013.01); *B23P 6/007* (2013.01); *F01D 5/005* (2013.01); *B22F 5/04* (2013.01); *B22F 2003/1056* (2013.01); *B22F 2007/068* (2013.01); *F05D 2230/31* (2013.01);
(Continued)

(58) Field of Classification Search
CPC .......... B23K 9/044; B23P 6/005; B23P 6/007; B23P 6/002; Y10T 29/49728; Y10T 29/4726; Y10T 29/49725; Y10T 29/49723; Y10T 29/49318; Y10T 29/49742;
(Continued)

(56) References Cited

U.S. PATENT DOCUMENTS 7,797,828 B2 * 9/2010 Beeson ................... B23P 6/007
29/888
2008/0083748 A1    4/2008 Thyssen et al.
(Continued)

FOREIGN PATENT DOCUMENTS

DE            10236907 A1    2/2004
DE         102004022386 A1   11/2005
(Continued)

*Primary Examiner* — Jermie Cozart
(74) *Attorney, Agent, or Firm* — Barlow, Josephs & Holmes, Ltd.

(57) ABSTRACT

The invention relates to a repair method for a component and includes the steps of removal of a damaged region of the component with the formation of at least one separating surface; arrangement of the component in a processing chamber of a device for the additive restoration of at least the region of the component that has been removed; determining first structural data of the component disposed in the processing chamber; providing second structural data of the component; determining third structural data based on the first and the second structural data; and additive restoration of the component region that has been removed on the at least one separating surface of the component. In addition, the invention relates to a device for the additive repair of a component.

11 Claims, 2 Drawing Sheets

Figure 1:
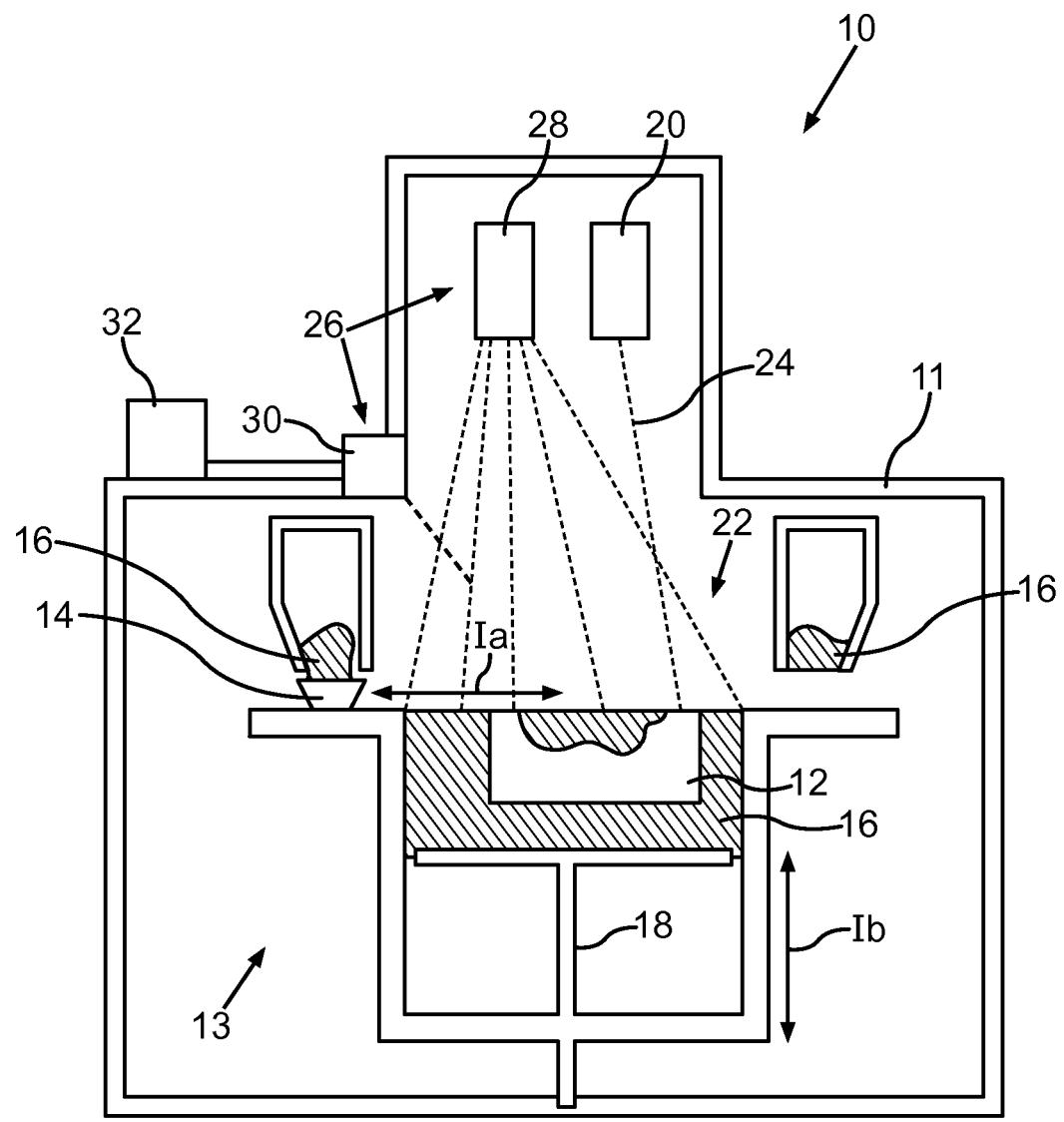

(51) Int. Cl.
  *F01D 5/00* (2006.01)
  *B22F 5/04* (2006.01)
  *B22F 7/06* (2006.01)
(52) U.S. Cl.
  CPC ........ *Y02P 10/295* (2015.11); *Y10T 29/49318* (2015.01); *Y10T 29/49723* (2015.01)
(58) Field of Classification Search
  CPC ......... Y10T 29/49737; Y10T 29/49734; Y10T 29/49732
  See application file for complete search history.

(56) References Cited

U.S. PATENT DOCUMENTS

| | | |
|---|---|---|
| 2008/0260964 A1 | 10/2008 | Bagavath-Singh et al. |
| 2012/0222306 A1 | 9/2012 | Mittendorf et al. |

FOREIGN PATENT DOCUMENTS

| | | | |
|---|---|---|---|
| DE | 102008058613 A1 | 5/2010 | |
| DE | 102010034311 A1 | 2/2012 | |
| DE | 102010050712 A1 | 5/2012 | |
| DE | 102012221782 A1 | 5/2014 | |
| EP | 1464791 A1 | 10/2004 | |
| EP | 2752720 A1 | 7/2014 | |
| EP | 2777867 A1 * | 9/2014 | ........... B23K 1/0018 |
| EP | 2778992 A1 | 9/2014 | |
| WO | 2005016588 A2 | 2/2005 | |
| WO | 2008034413 A1 | 3/2008 | |
| WO | 2008046388 A1 | 4/2008 | |

* cited by examiner

REPAIR METHOD FOR THE ADDITIVE REPAIR OF A COMPONENT

BACKGROUND OF THE INVENTION

The invention relates to a repair method for a component, in particular for a blade or vane of a gas turbine. In addition, the invention relates to a device for the additive repair of a component.

For the repair of worn or damaged components by means of additive repair methods, the individual recording of the exact actual geometric data based on the individual shape and damage of each component and a time-consuming adjustment of the target geometric data that are usually present as a CAD model are necessary. Subsequently, for the additive restoration of the damaged region of the component, the position, location and contour of the component surfaces to be worked in the processing space or construction space of the device employed must be defined precisely.

A repair method in which damaged turbine components are first cut back to a predetermined geometry is known from US 2012/0222306 A1. Subsequently, the component is inserted into a processing chamber of a laser-melting device and arranged in a defined position with a support. After this, the additive reconstruction of the damaged region is carried out layer by layer in order to repair the turbine component.

The circumstance that individual damage of the components can be considered only to a comparatively limited extent is to be viewed as a disadvantage in the known method, so that in certain cases an unnecessarily large quantity of material must be removed in order to obtain the predetermined geometry.

SUMMARY OF THE INVENTION

The object of the present invention is to create an additive repair method as well as a device for the additive repair of a component of the type named initially, which make possible an improved consideration of individual damage patterns.

The object is achieved according to the invention by a repair method and device for the additive repair of a component according to the present invention.

Advantageous embodiments with appropriate enhancements of the invention are given in the respective dependent claims, wherein advantageous embodiments of the repair method are to be viewed as advantageous embodiments of the device, and vice versa.

A first aspect of the invention relates to a repair method, which makes possible an improved consideration of individual damage patterns. In this case, the repair method according to the invention comprises the steps: removal of a damaged region of the component with the formation of at least one separating surface; arranging the component in a processing chamber of a device for the additive restoration of at least the region of the component that has been removed; determining first structural data of the component disposed in the processing chamber by means of a measurement system of the device; wherein the first structural data characterize an actual geometry of the component; providing second structural data of the component by means of a computing means of the device, wherein the second structural data characterize a target geometry of the component; determining third structural data based on the first and second structural data by means of the computing means, wherein the third structural data characterize a target geometry of the region of the component that has been removed; and additive restoration of the region of the component that has been removed on the at least one separating surface of the component, based on the third structural data, by means of construction means of the device. In other words, in distinction from the prior art, it is provided that first the damaged region of the component is removed. Preferably, this step is carried out in such a way that the removal is limited as much as possible to the damaged region of the component. Subsequently, the component is arranged in the processing chamber of the device for the additive restoration, where first the actual geometry of the component is determined by a measurement system of the device. This means that the actual geometry is not determined externally to the device as has been the case previously, but rather directly in the processing space of the device where the additive restoration of the damaged region of the component will also be conducted in a later method step. In this case, the determination of the actual geometry is electronically coded in the form of first structural data. In this case, it can be basically provided that the determination of the actual geometry is limited at least substantially to the field directly surrounding the damaged region of the component. Corresponding time advantages both in determining the actual geometry as well as in the subsequent calculation of the volume portion to be reconstructed can be realized thereby. Alternatively, however, the predominant or complete actual component geometry can also be determined, of course, whereby a broader database is made available for the further method steps.

Subsequently, the target geometry of the component is provided in the form of second structural data by means of a computing means. The second structural data also can be basically limited to the immediate surroundings of the damaged region or the region of the component that will be reconstructed. Alternatively, however, it can also be provided that the second structural data characterize the predominant or complete target geometry of the component involved. Third structural data will be determined on the basis of the first and second structural data by means of the computing means, whereby the third structural data characterize the target geometry of the removed region or of the region of the component that will be reconstructed. Thus, in the simplest configuration, only the difference between the first and second structural data is determined, which corresponds to the defective region of the component or to the volume portion to be reconstructed. Then the removed region of the component will be additively reconstructed, based on the third structural data, on the at least one separating surface of the component in the processing space of the device. Due to this modular repair method and the described algorithm for the flexible generation of component contours as a function of the actual geometry determined directly in the device, the previously necessary measurement, adjustment and alignment process can be clearly optimized or in fact can be completely avoided. Basically, the method according to the invention in the simplest embodiment can be composed of the named method steps and does not comprise additional method steps.

In an advantageous embodiment of the invention, it is provided that the damaged region of the component is separated by means of a separating process external to the device. This permits a good consideration of the individual pattern of damage, whereby, on the one hand, the separating step can be limited as much as possible to the damaged region of the component; on the other hand, however, a separating surface that is as flat as possible can also be formed, whereby usually the determination of the actual geometry and the additive reconstruction will be facilitated.

Additional advantages result by fixing the component in place by means of a retaining device in a predetermined spatial orientation in the processing chamber. This simplifies a defined spatial alignment of the component and thus the separating surface. It can be provided basically that the retaining device is designed to arrange the component in the processing chamber as a function of the first, second, and/or third structural data. For this purpose, the retaining device can be optionally coupled to the computing means.

In another advantageous embodiment of the invention, the first structural data are determined by means of a contact-free measurement system of the device. In particular, optical measurement systems offer the advantage of a rapid and precise detection of the actual geometry and can be integrated relatively simply into the device. By way of example, a stripe projection system can be used as the measurement system. In this case, a projector projects a stripe pattern onto the component, which is deformed as a function of the shape of the component. One or more cameras, which are preferably high resolution camera(s), characterize the deformed pattern, which then serves as the foundation for determining the topography or the actual geometry of the component. Of course, other optical measurement systems, such as, for example, 3D camera systems or the like, can also be used.

In another advantageous embodiment of the invention, the determination of the third structural data comprises the adjustment of first structural data and/or of second structural data by means of the computing means. In other words, it is provided that a so-called matching of actual geometry and target geometry is conducted, in order to correctly align the component and its model data to one another. Thus, the alignment can be purely software-based or can be conducted by means of the computing means, whereby further savings in time and cost are made possible, since the component itself can be disposed fixed in place relative to the processing chamber.

In another embodiment of the invention, it is provided that the adjustment comprises the triangulation and/or the translation and/or the rotation and/or the scaling of first and/or second structural data by means of the computing means. Deviations between the actual geometry and the target geometry of the component can be optimally compensated thereby.

Additional advantages result by conducting the adjustment based on at least one undamaged region of the component and/or based on surface focal points of the component and/or based on nodal points and/or based on an equilibration calculation by means of the computing means. This permits a particularly precise adjustment of the first and second structural data to each another, whereby correspondingly precise third structural data can be determined for the component region to be reconstructed.

In another advantageous embodiment of the invention, it is provided that the adjustment comprises the determination of a transition profile between the actual geometry and the target geometry by means of the calculating means. Deviations that exceed or go below a threshold value and that have arisen, for example, due to local wear or due to production tolerances, can be equilibrated between actual geometry and target geometry by means of such a transition profile.

In this case, in another embodiment of the invention, it has been shown to be advantageous if the transition profile is determined by means of the computing means by taking into consideration geometrical parameters of the component and/or parameters of the material, and/or parameters dependent on the device. For example, a maximum structural angle predefined by the device used in each case can be considered in the determination of the transition profile, in order to reliably prevent inadmissible geometric structures in the third structural data. The same holds true for the inclusion of geometrical parameters of the component, for example, the geometry of cooling air ducts, and parameters of the material, for example, the melting point of the metal powder or the like that is used. A particularly high quality of the repair is assured thereby.

Additional advantages result by producing a transformation of the third structural data into layer data for the additive restoration of the removed region of the component by means of the calculating means, and based on these layer data, a layer-by-layer construction of the removed region of the component is carried out by means of the construction means. In other words, volume data are converted into layer data by means of the computing means, whereby the layer-by layer additive construction of the region of the component to be restored is facilitated.

After the additive restoration, at least the additively produced region of the component can be post-processed, for example, coated or polished, in particular by means of a separating process and/or a coating process.

A second aspect of the invention relates to a device for the additive repair of a component, in particular a blade or vane of a gas turbine. According to the invention, the device in this case comprises at least one processing chamber, in which can be arranged the component for the additive restoration, at least for a region of the component that has been removed. In addition, the device comprises a measurement system, by means of which first structural data of the component arranged in the processing chamber can be determined, wherein the first structural data characterize the actual geometry of the component, as well as a computing means by means of which, on the one hand, second structural data of the component can be provided, wherein the second structural data characterize the target geometry of the component, and, on the other hand, third structural data can be determined on the basis of the first and second structural data, wherein the third structural data at least characterize the region of the component that has been removed. In addition, the device comprises construction means for the additive restoration of the component region that has been removed, based on the third structural data. In the simplest embodiment, the device according to the invention can be composed of the named elements and does not comprise other equipment or the like. Because the measurement system is integrated into the device and the damaged component can be measured directly in the processing chamber in order to determine its actual geometry, the device according to the invention makes possible an improved consideration of individual damage patterns. In addition, considerable advantages relating to time and cost can be realized by means of the device according to the invention, since in addition to the manual measuring of the component outside the device, a positioning step of the component inside the device can also be dispensed with. Instead of this, the defective component region can be determined from the first and second structural data by means of the computing means and can be reconstructed on the separating surface of the component without further positioning steps or the like. Additional advantages are derived from the description of the first aspect of the invention.

In an advantageous embodiment of the invention, it is provided that the construction means for the additive restoration of the component region that has been removed comprises at least a supply of powder for the allocation of at least one powder-form component material found on a component platform and/or on a separating surface of the component, as well as at least one high-energy source, by means of which at least one high-energy beam for a layer-by-layer and local melting and/or sintering of the component material can be generated in the region of a construction and joining zone of the component platform and/or of the separating surface. The high-energy source can be designed, for example as a laser-beam (pulsed laser) and/or electron-beam source.

Additional advantages result if the device comprises a retaining device, by means of which the component can be fixed in place in a predetermined spatial orientation in the processing chamber. The locally fixed arrangement of the component relative to the processing chamber, in particular, facilitates the alignment or adjustment of the actual geometry and the target geometry.

Additional advantages result if the measurement system is designed as an optical measurement system. This permits a rapid, precise, and contact-free determination of the actual geometry of the component. For example, the measurement system can be designed as a stripe projection system. This can be integrated into the device in a particularly simple way.

BRIEF DESCRIPTION OF THE DRAWING FIGURES

Figure 2:
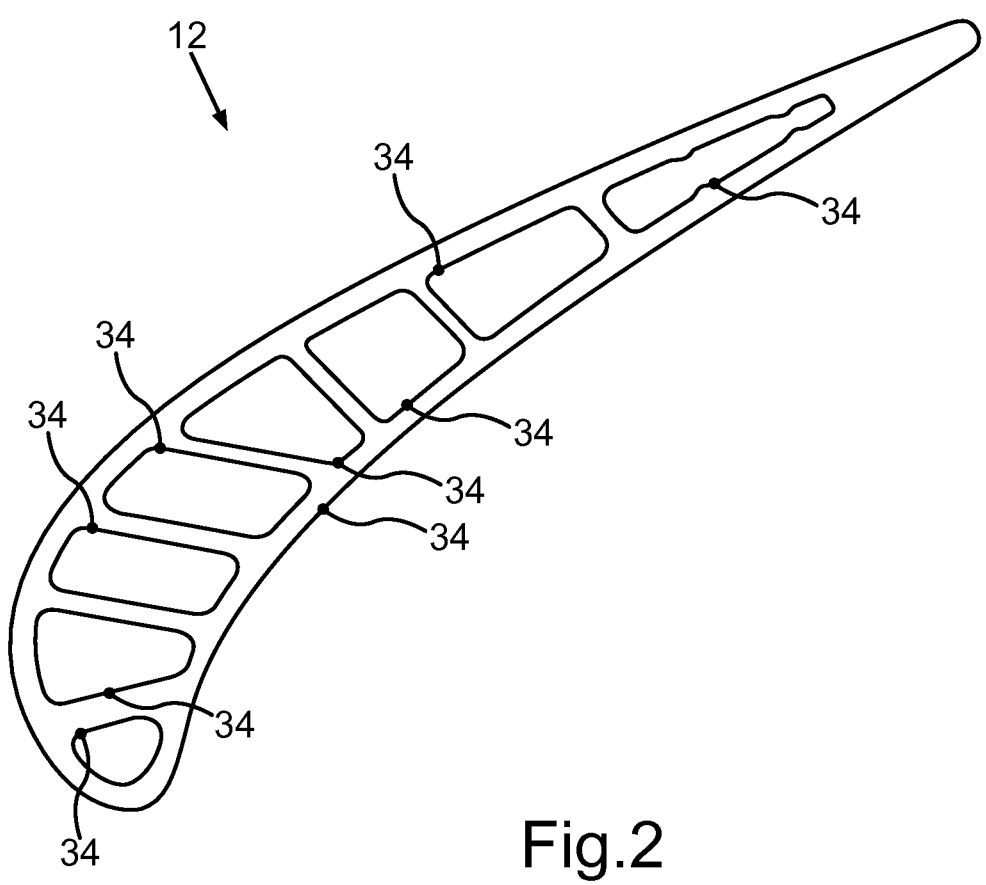

Additional features of the invention result from the claims, the exemplary embodiment, and on the basis of drawings. The features and combinations of features named above in the description as well as the features and combinations of features named in the following exemplary embodiment can be used not only in the respectively indicated combination, but also in other combinations, without departing from the scope of the invention. Here:

FIG. 1 shows a schematic sectional view of an exemplary embodiment of a device according to the invention for the additive repair of a component; and FIG. 2 shows a sectional view through a target geometry of the component.

DETAILED DESCRIPTION OF THE INVENTION

FIG. 1 shows a schematic sectional view of an exemplary embodiment of a device 10 according to the invention for the additive repair of a component 12, which is designed presently as a rotating blade of a turbine of an aircraft engine. The device 10 comprises a processing chamber 11, in which construction means 13 for the additive restoration of a region of the component 12 is found. The construction means 13 in the present exemplary embodiment comprises a powder supply 14 that can move according to double arrow Ia for the allocation of at least one powder-form component material 16, this supply found on a component platform 18 that can move according to double arrow Ib. In addition, a high-energy source 20 presently designed as a laser is provided, by means of which a laser beam or pulsed laser 24 is generated in the region of a construction and joining zone 22 of the component platform 18 for a layerwise and local melting and/or sintering of the component material 16. Equipment for adjusting the spatial deflection, focusing, and thermal power of the laser beam 24 are not shown for reasons of clarity.

For the additive repair of the component 12, the latter is first worked on by means of a separating process, in order to completely remove the damaged volume or the damaged region of the component with the formation of at least one separating surface. Subsequently, the component 12 is disposed in the processing chamber 11 and is preferably fixed in place in such a way that the separating surface is aligned upward, at least predominantly upward.

In addition, the device 10 comprises a measurement system 26, by means of which first structural data of the component 12 disposed in the processing chamber 11 are determined, wherein the first structural data characterize the actual geometry of the component. The measurement system 26 can basically be designed as modular, in order to be able to be simply adapted to different devices 10, processing chambers 11, and/or components 12. In the exemplary embodiment shown, the measurement system 26 is formed as a stripe projection system for this purpose. Correspondingly, a projector 28 projects a stripe pattern onto the component 12, whereby the stripe pattern is deformed as a function of the shape of the component. A high-resolution camera 30 characterizes the deformed pattern, which serves as the basis for the determination of the topography or the actual geometry of the component 12. In this case, it may be sufficient that the camera 30 records only the region of the separating surface of the component, in order to determine from this the first structural data—for example, in the form of a CAD contour definition. In addition, the measurement system 26 is coupled to a computing means or device 32 for the exchange of data. The computing device 32 provides second structural data of the component 12, wherein the second structural data characterize a target geometry of the component. Based on the first and the second structural data, the computing device 32 then determines third structural data, wherein the third structural data at least characterize the region of the component 12 that has been removed or the volume element to be constructed.

In this case, it can be provided that the first and the second structural data, i.e., the actual geometry and the target geometry of the component 12 are first aligned to one another by means of the computing device 32. A positioning, scaling, and/or alignment of the target geometry in this case is provided by means of the computing device 32, taking into consideration the actual geometry or the geometry of unworn regions of the component 12, employing surface focal points and/or best-fit algorithms. FIG. 2 shows a sectional view through a target geometry of the component 12 for clarification. One recognizes different points 34, which can be used individually or in any combination as nodal points, support points, and/or surface focal points of the component 12 for adjusting the actual geometry and the target geometry, for example, via best-fit algorithms. The points 34 can be predetermined for a specific type of component and co-coded, for example, in the target geometry or the second structural data, and/or can be dynamically determined.

The equilibration of actual geometric data and target geometric data by means of the computing device 32 may comprise additional steps for the compensation of inadmissible deviations of the actual geometry of the component 12. In this case, a transition profile between the actual geometry and the target geometry is calculated by means of the computing device 32 and taken into consideration in determining the third structural data. The determination of the transition profile can comprise defined displacements, for example, of the nodal points, from triangulated geometrical data in a defined component region. A continuous transition from the actual geometry to the target geometry is assured thereby. Boundary conditions can also be defined on the basis of known processing parameters and taken into consideration in creating the transition profile. An individual volume portion with a continuous transition from the actual geometry to the target geometry results from this for each component 12. Then, depending on the third structural data, the region of the component that was previously removed is additively reconstructed layer by layer with the help of construction means 13, in order to repair the component 12. Subsequently, at least the restored region of the component can be post-processed as needed.

By means of the optical measurement system 26 integrated into the device 10 and the above-presented method steps for the flexible generation of component contours dependent on the individual actual geometry of the component 12 which already has been placed in the device 10, the measurement, adjustment, and alignment processes can be greatly optimized, and corresponding advantages in time and cost can be realized.

What is claimed is:

1. A repair method for a component, comprising the steps of:
    removing a damaged region of the component with the formation of at least one separating surface;
    arranging the component in a processing chamber of a device for the additive restoration of at least the region of the component that has been removed;
    determining first structural data of the component disposed in the processing chamber by a measurement system of the device, wherein the first structural data characterize an actual geometry of the component;
    providing second structural data of the component by a computing device of the device, wherein the second structural data characterize a target geometry of the component;
    determining third structural data based on the first and the second structural data by the computing device, wherein the third structural data characterize a target geometry of the region of the component that has been removed; and
    additively restoring the component region that has been removed on the at least one separating surface of the component based on the third structural data by a construction apparatus of the device.

2. The repair method according to claim 1, wherein the damaged region of the component is separated outside the device by a separating process.

3. The repair method according to claim 1, wherein the component is fixed in place in a predetermined spatial orientation in the processing chamber by a retaining device.

4. The repair method according to claim 1, wherein the first structural data are determined by a contact-free measurement system of the device.

5. The repair method according to claim 1, wherein the step of determining the third structural data comprises adjusting first structural data and/or second structural data by the computing device.

6. The repair method according to claim 5, wherein the adjusting comprises the triangulation and/or the translation and/or the rotation and/or the scaling of first and/or second structural data by the computing device.

7. The repair method according to claim 5, wherein the adjusting is carried out based on at least one undamaged region of the component and/or based on surface focal points of the component and/or based on nodal points and/or based on an equilibration calculation by the computing device.

8. The repair method according to claim 5, wherein the adjusting comprises determining a transition profile between the actual geometry and the target geometry by the computing device.

9. The repair method according to claim 8, wherein the transition profile is determined by taking into consideration geometric parameters of the component and/or parameters of the material and/or parameters dependent on the device by the computing device.

10. The repair method according to claim 1, wherein, for the step of additively restoring the component region that has been removed, a transformation of the third structural data into layer data is provided by the computing device, on the basis of which a layer-by-layer construction of the removed region of the component is carried out by the construction apparatus.

11. The repair method according to claim 1, wherein at least the additively produced component region is post-processed by a separating process and/or a coating method.

* * * * *